No. 821,520. PATENTED MAY 22, 1906.
S. & J. MOELLER.
WHEEL SUPPORT FOR PLOWS.
APPLICATION FILED AUG. 29, 1905.
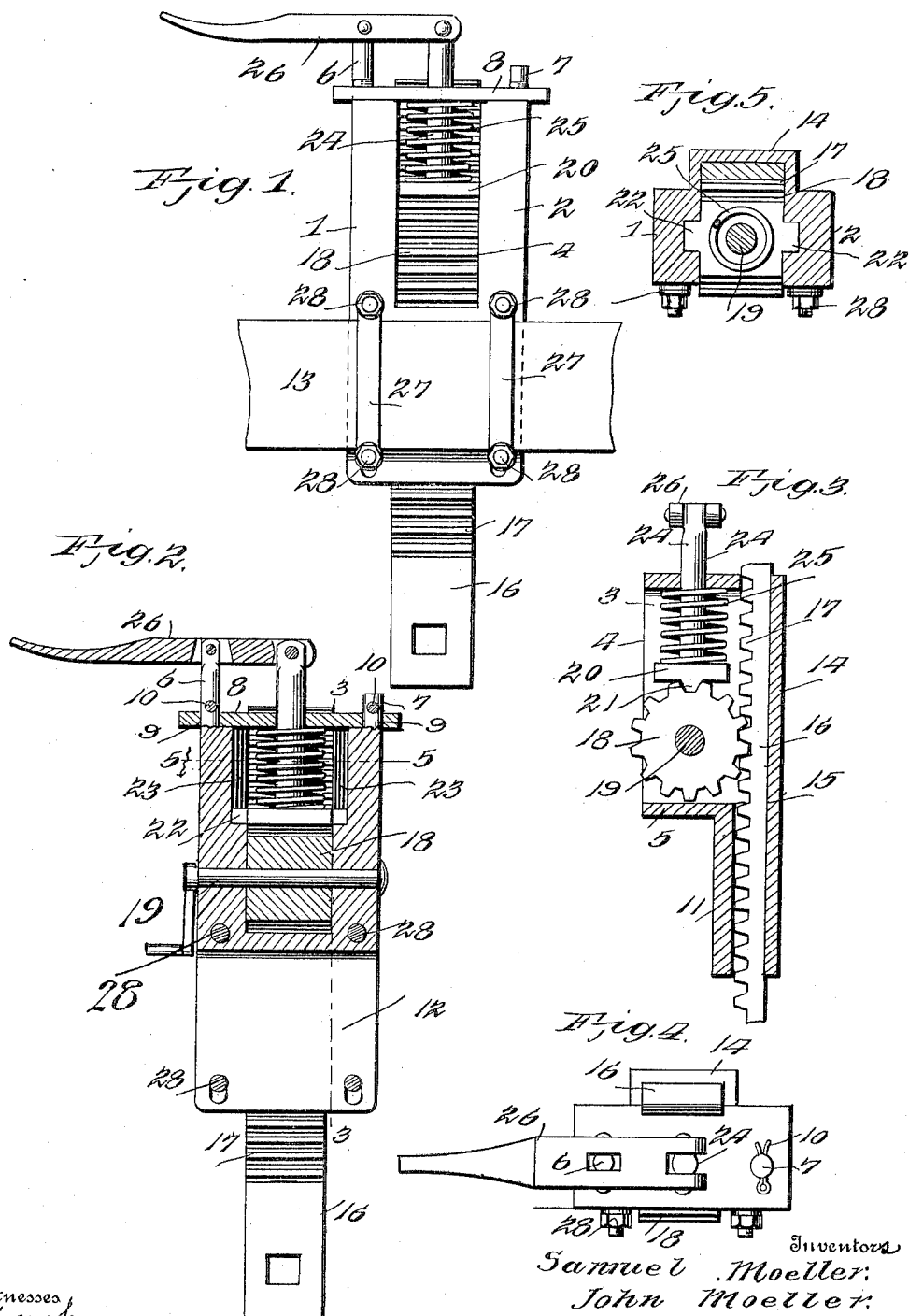
Witnesses
J. Hough
C. C. Hines
Inventors
Samuel Moeller
John Moeller
By Victor J. Evans
Attorney

UNITED STATES PATENT OFFICE.

SAMUEL MOELLER, OF SEBEWAING, AND JOHN MOELLER, OF BAY PORT, MICHIGAN.

WHEEL-SUPPORT FOR PLOWS.

No. 821,520.　　　　　Specification of Letters Patent.　　　　Patented May 22, 1906.

Application filed August 29, 1905. Serial No. 276,285.

*To all whom it may concern:*

Be it known that we, SAMUEL MOELLER, residing at Sebewaing, and JOHN MOELLER, residing at Bay Port, in the county of Huron and State of Michigan, citizens of the United States of America, have invented new and useful Improvements in Wheel-Supports for Plows, of which the following is a specification.

This invention relates to wheel-supports for plows, the object of the invention being to provide a novel construction of wheel-carrying standard and means for mounting the same upon the beam of the plow, whereby the standard may be readily and conveniently adjusted to raise and lower the carrier-wheel or colter and securely locked in adjusted position.

The preferred embodiment of the invention is illustrated in the accompanying drawings, in which—

Figure 1 is a side elevation of the device applied to a plow-beam. Fig. 2 is a vertical longitudinal section of the same, taken on the line of the axis of the gear-wheel. Fig. 3 is a vertical transverse section taken on the line 3 3 of Fig. 2. Fig. 4 is a top plan view of the device, and Fig. 5 is a horizontal section taken on the line 5 5 of Fig. 2.

Referring now more particularly to the drawings, the numeral 1 designates a supporting frame or casting having a rectangular body portion 2, formed with a chamber 3, open at its outer side, as indicated at 4, and closed by a bottom wall 5. The spring-opening 4 of chamber 3 is for the reception of the gear-wheel 18 when the same is fitted to the side walls of the chamber. The upper ends of the side walls of the chamber are provided with projecting studs or stems 6 and 7, on which is fitted a top or cover plate 8, which closes the upper end of the chamber 3 and is formed with openings 9 for the passage of said studs, each of which latter is formed with a transverse aperture for the passage of a cotter pin or key 10 to retain the top plate in position.

The bottom wall 5 is provided with a depending extension 11, constituting a bearing-plate, which is disposed in rear of the front wall of the frame or casting to provide a recess 12 for the reception of the plow-beam 13. On the rear side of the frame or casting a three-sided boss or extension 14 is formed and is coextensive in length with the combined length of the body portion and bearing-wall 11 and forms a guide-passage 15, opening into the chamber 3 and adapted for the reception of the wheel-supporting standard 16, which is provided with a rack-toothed surface 17. The lower end of this extension is suitably constructed for the attachment of the shaft or carrier-arm of the colter or supporting-wheel. (Not shown.)

A toothed wheel 18 is arranged in the lower portion of the chamber 3 to mesh with the teeth of the standard 16 and is mounted upon an axle 19, passed through the side walls of said chamber, said wheel being adapted to normally permit of the free adjustment of the standard. In order to lock the wheel against rotation, a dog or pawl, comprising a rectangular plate 20, provided with a tooth 21, coextensive in length with the teeth of the wheel, is provided. This dog is formed at its ends with guide-lugs 22, which fit and slide in guide-recesses 23, formed in the upper portions of the side walls of the chamber 3 and opening through the top thereof, so as to permit the dog to be readily applied and removed. The dog is carried by a stem 24, movable vertically in a guide-opening in the top plate 8, and is normally held in engagement with the wheel by a coiled projecting spring 25, disposed about the stem between said top wall and the dog. The dog is thereby normally held in engagement with the wheel to hold the same from rotation and to thus lock the standard 16 in adjusted position. A lever 26 is fulcrumed upon the stud 6 and pivotally connected to the upper end of the stem 24, whereby the dog may be retracted to permit the wheel to turn and the stem 16 to move up or down to regulate the position of the supporting-wheel relative to the beam and the height of the latter above the surface of the ground.

The device is applied in practice upon the land side of the beam 13, with the bearing-plate 11 engaging such side of the beam and the base-plate 5 resting upon the top of the beam. To secure it in position, clamping-plates 27 are employed to engage the opposite side of the beam and are fastened in position by bolts 28, passing through openings in the body portion and bearing-plate.

From the foregoing description, taken in connection with the accompanying drawings the construction and mode of use of the invention will be readily understood, and it will be seen that it provides a wheel-supporting attachment which is simple in construction, effective in operation, adapted to permit of the ready adjustment of the wheel, and to firmly and securely lock the same in adjusted position.

Having thus described the invention, what is claimed as new is—

1. A wheel-supporting attachment for plows comprising a frame having a chamber and provided with means of attachment to the beam of the plow, a wheel-supporting standard vertically adjustable on the frame and provided with rack-teeth, a toothed wheel disposed in said chamber and engaging said rack-teeth, a spring-actuated sliding dog within the chamber to engage and lock the wheel from rotation, and means for retracting the dog.

2. A wheel-supporting attachment for plows comprising a body portion having a chamber therein closed by a bottom wall adapted to rest upon the top of the beam, said bottom wall being provided with a depending bearing-plate adapted to rest against one side of the beam and an extension on the rear side forming a guide-passage communicating with said chamber, a wheel-supporting standard vertically adjustable in said guide-passage and provided with rack-teeth, a gear disposed in the lower portion of the chamber and engaging said rack-teeth, a vertically-movable dog in the upper portion of the chamber to engage and lock the gear from rotation, a spring for projecting said dog, means for retracting the dog, and clamping elements for securing the device in position upon the beam.

3. In a wheel-supporting attachment for plows, the combination of a frame having a chamber provided with grooves and a guide-passage communicating therewith, a supporting-standard provided with rack-teeth and mounted within said guide-passage, a gear-wheel adapted to engage the teeth of the supporting-standard and hold the same in adjusted position, the said chamber being open at one side for the insertion and removal of the wheel, a sliding spring-actuated dog mounted in the grooves and within the chamber, and a removable top plate on the chamber with means for fastening the same, whereby the dog-securing means may be assembled.

In testimony whereof we affix our signatures in presence of two witnesses.

SAMUEL MOELLER.
JOHN MOELLER.

Witnesses:
GEO. H. G. SHAW,
F. W. MERRICK.